United States Patent
Cha et al.

(10) Patent No.: US 8,553,074 B2
(45) Date of Patent: Oct. 8, 2013

(54) AUTO STEREOSCOPIC DISPLAY IMPROVING BRIGHTNESS

(75) Inventors: Kyung-hoon Cha, Yongin-si (KR); Dae-sik Kim, Suwon-si (KR); Sergey Shestak, Suwon-si (KR); Seon-deok Hwang, Jochiwon-eup (KR); Jae-seung Kim, Yongin-si (KR); Sang-moo Park, Uijeongbu-si (KR); Jae-phil Koo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1251 days.

(21) Appl. No.: 12/026,785

(22) Filed: Feb. 6, 2008

(65) Prior Publication Data

US 2009/0046142 A1    Feb. 19, 2009

(30) Foreign Application Priority Data

Aug. 14, 2007 (KR) .................. 10-2007-0081712

(51) Int. Cl.
 *H04N 13/04*     (2006.01)
(52) U.S. Cl.
 USPC ............................................. 348/51; 348/42
(58) Field of Classification Search
 None
 See application file for complete search history.

(56) References Cited

U.S. PATENT DOCUMENTS

| | | | | |
|---|---|---|---|---|
| 4,164,748 A | * | 8/1979 | Nagata | 348/59 |
| 7,583,307 B2 | * | 9/2009 | Oikawa et al. | 348/51 |
| 7,876,350 B2 | * | 1/2011 | Shin et al. | 348/51 |
| 8,179,426 B2 | * | 5/2012 | Harrold et al. | 348/51 |
| 2004/0169670 A1 | | 9/2004 | Uehara et al. | |
| 2005/0001787 A1 | * | 1/2005 | Montgomery et al. | 345/6 |
| 2007/0014023 A1 | | 1/2007 | Pezzaniti | |
| 2007/0120973 A1 | | 5/2007 | Kim et al. | |

FOREIGN PATENT DOCUMENTS

| | | |
|---|---|---|
| JP | 2006521573 A | 9/2006 |
| JP | 2007156413 A | 6/2007 |
| WO | WO 9827451 A1 * | 6/1998 |
| WO | WO 2005078520 A1 * | 8/2005 |

OTHER PUBLICATIONS

NN9412177. "Autostereoscopic 3-D Image Display Device." IBM Technical Disclosure Bulletin. Dec. 1, 1994. vol. 37, Issue 12, 3 pages.*
Communication dated Aug. 9, 2013 from the Korean Intellectual Property Office in counterpart Korean application No. 10-2007-0081712.

* cited by examiner

*Primary Examiner* — Jeffrey R Swearingen
(74) *Attorney, Agent, or Firm* — Sughrue Mion, PLLC

(57) ABSTRACT

Provided is an auto stereoscopic display improving brightness, including: a left eye pixel including a plurality of first color sub pixels and a first white sub pixel; a right eye pixel including a plurality of second color sub pixels and a second white sub pixel; and a viewing field separating unit which separates a viewing field of a left image formed by the left eye pixel and a viewing field of a right image formed by the right eye pixel.

9 Claims, 7 Drawing Sheets

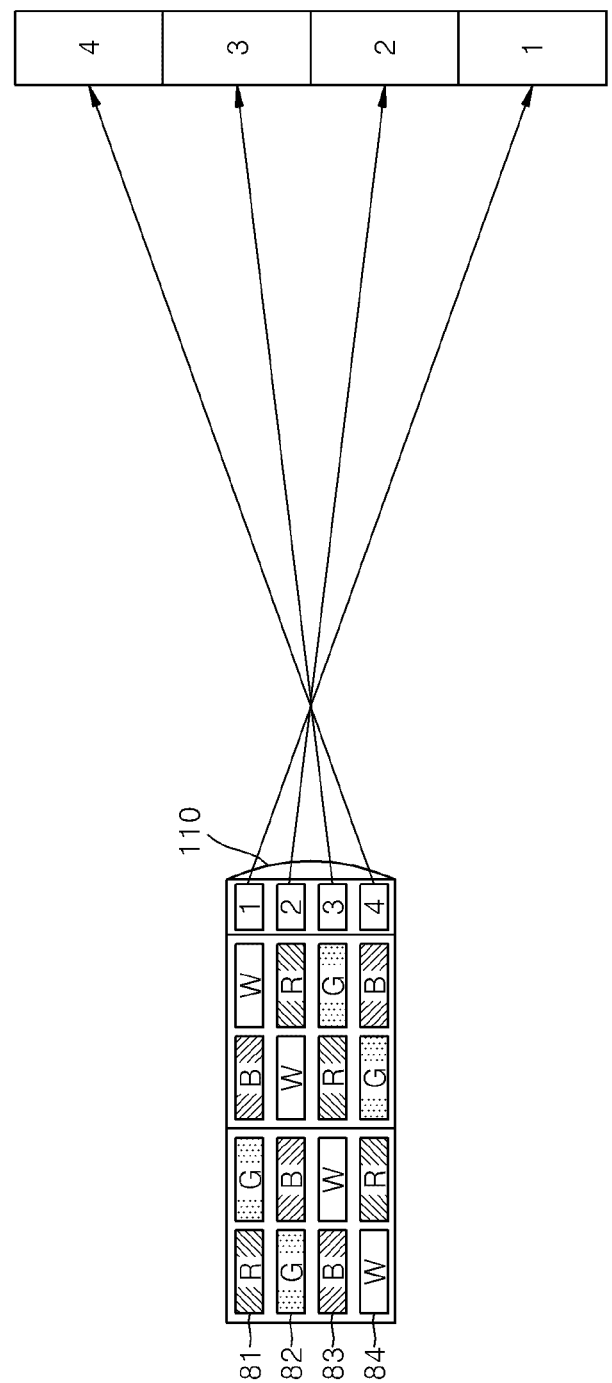

AUTO STEREOSCOPIC DISPLAY IMPROVING BRIGHTNESS

CROSS-REFERENCE TO RELATED PATENT APPLICATION

This application claims priority from Korean Patent Application No. 10-2007-0081712, filed on Aug. 14, 2007 in the Korean Intellectual Property Office, the disclosure of which is incorporated herein in its entirety by reference.

BACKGROUND OF THE INVENTION

1. Field of the Invention

The present invention relates to an auto stereoscopic display.

2. Description of the Related Art

In general, a three-dimensional (3-D) image is realized by a stereoscopic vision principle of two eyes of a person. Since the two eyes of the person keep a distance of about 65 mm, binocular parallax may be regarded as the most important factor of a 3-D effect. A 3-D image display is classified into a glasses-typed display and an auto stereoscopic display. The auto stereoscopic display separates left and right images from each other without using glasses to obtain a 3-D image.

In order to view a 3-D image displayed by the glasses-typed display, a user must wear glasses. Thus, the auto stereoscopic display is preferred to the glasses-typed display. As described above, the auto stereoscopic display separates left and right images from each other without using glasses to obtain a 3-D image. Examples of the auto stereoscopic display include a parallax barrier display and a lenticular display.

Basic principles of the parallax barrier display and the lenticular display are similar in that a specific optical plate, e.g., a barrier, a lenticular lens, etc., is positioned in front of or in the rear of a display panel to spatially separate images having different viewing points. A space division method or a time division method is used to separate left and right images so as to prevent resolution from being lowered when a 3-D image is formed. However, if the space division method is used, light transmissivity of a pixel is relatively lower, and thus brightness is lower than in the time division method.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an auto stereoscopic display improving brightness.

According to an aspect of the present invention, there is provided an auto stereoscopic display including: a left eye pixel including a plurality of first color sub pixels and a first white sub pixel; a right eye pixel including a plurality of second color sub pixels and a second white sub pixel; and a viewing field separating unit separating a viewing field of a left image formed by the left eye pixel and a viewing field of a right image formed by the right eye pixel.

The left and right eye pixels may be arranged side by side in a widthwise direction, the first color sub pixels and the first white sub pixel may be arranged in a lengthwise line, and the second color sub pixels and the second white sub pixel may be arranged in a lengthwise line.

The first and second white sub pixels may be arranged in different lines.

The first color sub pixels may be respectively red, green, and blue sub pixels, and the second color sub pixels may be respectively red, green, and blue sub pixels, wherein left eye red and blue sub pixels are respectively arranged beside right eye red and blue sub pixels, and left eye green and white sub pixels are respectively arranged beside right eye green and white sub pixels.

The viewing field separating unit may be a lenticular lens which is disposed to correspond to a pair of left eye pixels and a pair of right eye pixels.

The viewing field separating unit may be a lenticular lens which is disposed to correspond to a plurality of pairs of left eye pixels and a plurality of pairs of right eye pixels.

BRIEF DESCRIPTION OF THE DRAWINGS

The above and other aspects of the present invention will become more apparent by describing in detail exemplary embodiments thereof with reference to the attached drawings in which:

FIG. 6 illustrates an operation of realizing a multi-view stereoscopic image in an auto stereoscopic display according to an exemplary embodiment of the present invention.

DETAILED DESCRIPTION OF EXEMPLARY EMBODIMENTS OF THE INVENTION

An auto stereoscopic display according to the present invention includes a first pixel for a left image and a second pixel for a right image. Each of the first and second pixels includes white sub pixels. The left image formed in the first pixel advances into a left viewing field, and the right image formed in the second pixel advances into a right viewing field. Thus, the left and right images are separated from each other to be displayed as a 3-D image.

Figure 1:
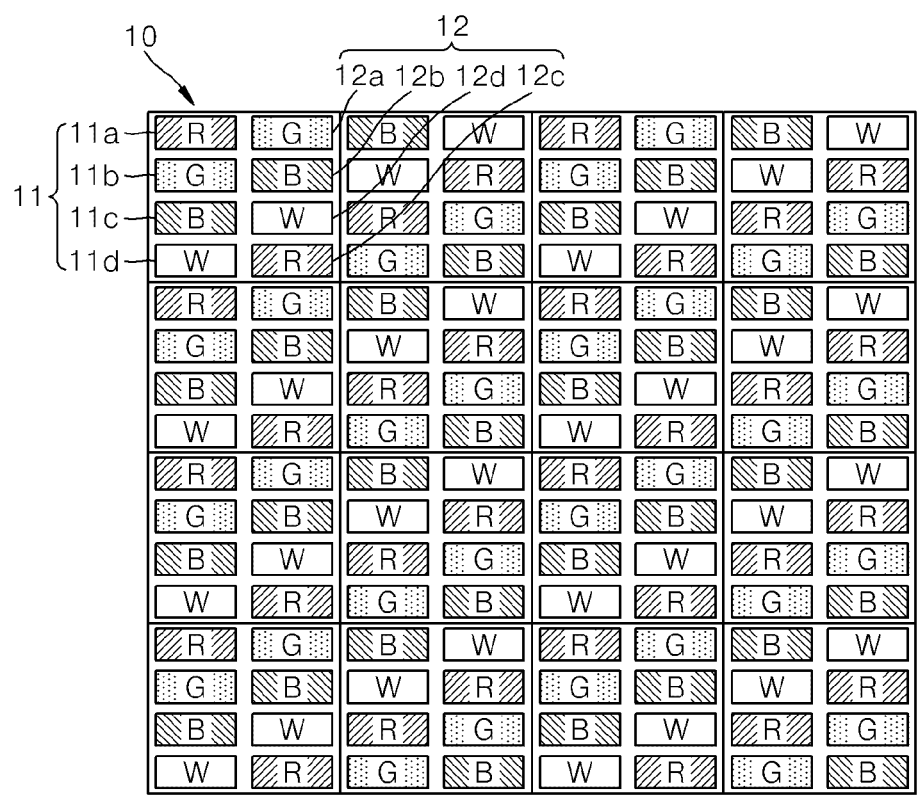
FIGS. 1, 2, 3 and 4 illustrate pixel structures of auto stereoscopic displays according to exemplary embodiments of the present invention.

Referring to FIG. 1, a pixel set 10 including a first pixel 11 and a second pixel 12 is arranged in a matrix format. The first pixel 11 includes a plurality of first color sub pixels, e.g., sub pixels 11a, 11b, and 11c, and a first white sub pixel 11d, and the second pixel 12 includes a plurality of second color sub pixels, e.g., sub pixels 12a, 12b, and 12c, and a second white sub pixel 12d. The plurality of first color sub pixels 11a, 11b, and 11c and the first white sub pixel 11d may be arranged in a line or column. The plurality of second color sub pixels 12a, 12b, and 12c and the second white sub pixel 12d may be arranged in a line or column. In other words, the pixel set 10 may be arranged in a 2×4 matrix format. Also, the first and second pixels 11 and 12 are arranged side by side, i.e., in adjacent columns. Each of the first and second pixels 11 and 12, green (G), blue (B), and red (R) sub pixels may be arranged in various orders.

Sub pixels of the first and second pixels 11 and 12 arranged side by side may have the same color or different colors. The first white sub pixel of the first pixel 11 may be diagonal to the second white sub pixel of the second pixel 12. Here, the first and second pixels 11 and 12 form a set to display a stereoscopic image. First and second pixels are alternately arranged. As shown in FIG. 1, color sub pixels and a white sub pixel of the first pixel may be diagonal to color sub pixels and a white sub pixel of the second pixel. Also, the color sub pixels of the first pixel may respectively have the same colors as those of the second pixel. If sub pixels having the same colors are diagonally arranged, orders of sub pixels in a widthwise direction are the same as those of sub pixels in a lengthwise direction. Thus, an image may be easily changed from a widthwise display into a lengthwise display or from the lengthwise display into the widthwise display.

Figure 2:
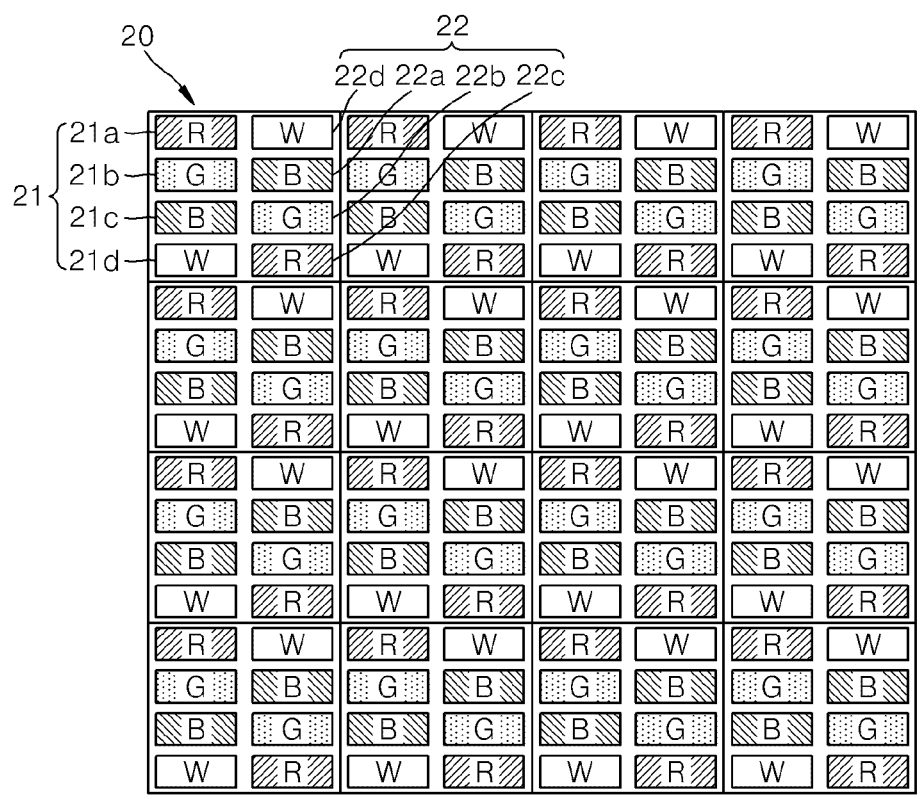

Referring to FIG. 2, a pixel set 20 including first and second pixels 21 and 22 is repeatedly arranged. The first pixel 21 is for a left eye and includes a plurality of first color sub pixels, e.g., R, G, and B sub pixels 21a, 21b, and 21c which are arranged in order, and a first white sub pixel 21d, and the second pixel 22 is for a right eye and includes a plurality of second color sub pixels, e.g., B, G, and R sub pixels 22b, 22c, and 22d which are arranged in order, and a second white sub pixel 22d. The first white sub pixel 21d may be arranged in a lowest sub pixel line of the first pixel 21, and the second white sub pixel 22d may be arranged in a highest sub pixel line of the second pixel 22. Here, the first and second white pixels 21d and 22d are wholly arranged in "W" shapes.

In the exemplary embodiments of the present invention, each pixel includes a white sub pixel to improve brightness of each pixel. Moreover, white sub pixels are not consecutively arranged in a lengthwise line (i.e., column) or a widthwise line (i.e., row) so as to uniformly improve brightness of a whole picture.

Figure 3:
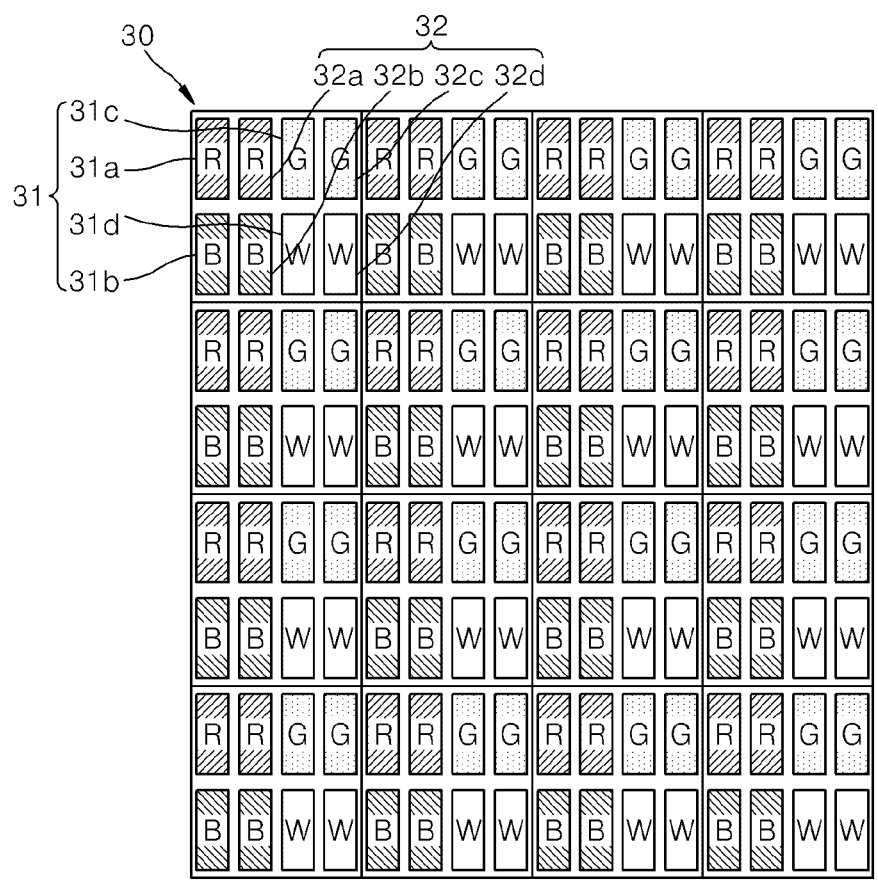

As shown in FIG. 3, in an auto stereoscopic display according to the present invention, first and second pixels 31 and 32 are regularly arranged. The first pixel 31 is for a left eye and includes first, second, and third color sub pixels 31a, 31b, and 31c and a first white sub pixel 31d, and the second pixel 32 is for a right eye and includes fourth, fifth, and sixth sub pixels 32a, 32b, and 32c and a second white sub pixel 32d. Color sub pixels of the first pixel 31 and color sub pixels of the second pixel 32 are respectively arranged in two rows. The other color sub pixel of the first pixel 31 and the other color sub pixel of the second pixel 32 are respectively arranged in two rows beside the color sub pixels of the first and second pixels 31 and 32. In more detail, the first and second color sub pixels 31a and 31b are arranged in a lengthwise line, the fourth and fifth color sub pixels 32a and 32b are arranged in a lengthwise line, the third color sub pixel 31c and the first white sub pixel 31d are arranged in a lengthwise line, and the sixth color sub pixel 32c and the second white sub pixel 32d are arranged in a lengthwise line. Here, the lengthwise lines are arranged in a widthwise direction in order. In other words, a pixel set including left and right eye pixels is arranged in a 4×2 matrix.

Here, a line including a white sub pixel and a line not including a white sub pixel are alternately arranged.

Figure 4:
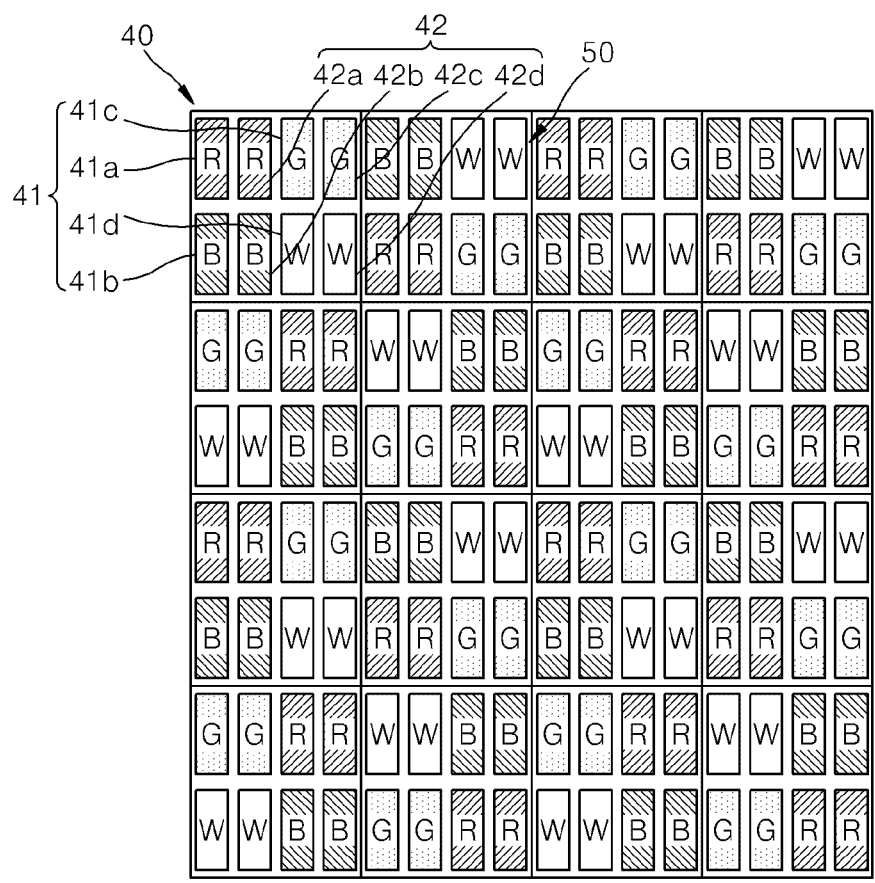

Referring to FIG. 4, an auto stereoscopic display according to the present exemplary embodiment includes first and second pixels 41 and 42 which are respectively left and right eyes. The first pixel 41 includes first, second, and third color sub pixels 41a, 41b, and 41c and a first white sub pixel 41d, and the second pixel 42 includes fourth, fifth, and sixth color sub pixels 42a, 42b, and 42c and a second white sub pixel 42d. The first and second color sub pixels 41a and 41b are arranged in a lengthwise line, the fourth and fifth color sub pixels 42a and 42b are arranged in a lengthwise line beside the first and second color sub pixels 41a and 41b, the third color sub pixel 41c and the first white sub pixel 41d are arranged in a lengthwise line beside the fourth and fifth color sub pixels 42a and 42b, and the sixth color sub pixel 42c and the second white sub pixel 42d are arranged in a lengthwise line beside the third color sub pixel 41c and the first white sub pixel 41d.

In the auto stereoscopic display of the present exemplary embodiment, a first pixel set 40 including first and second pixels and a second pixel set 50 including first and second pixels are alternately arranged. A color arrangement order of the first pixel set 40 is different that of the second pixel set 50. In the present exemplary embodiment, a white sub pixel is arranged at a predetermined distance in each pixel line.

The present invention suggests a color pixel arrangement structure to realize a 3-D image having improved brightness. A white sub pixel is arranged in each pixel to improve brightness.

Figure 5A:
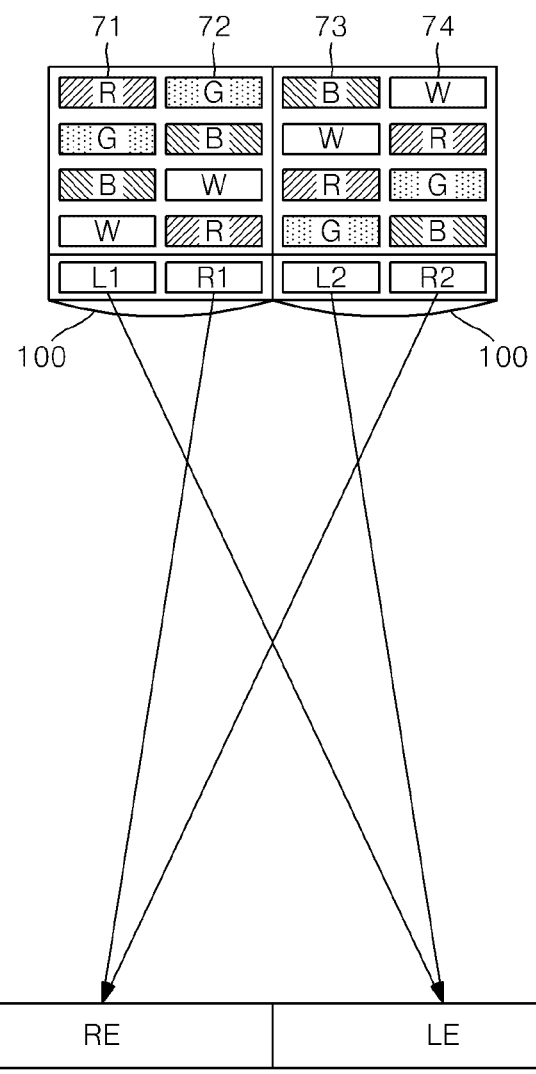
FIG. 5A illustrates an operation of realizing a two-view stereoscopic image through lenticular lenses in an auto stereoscopic display according to an exemplary embodiment of the present invention.
Figure 5B:
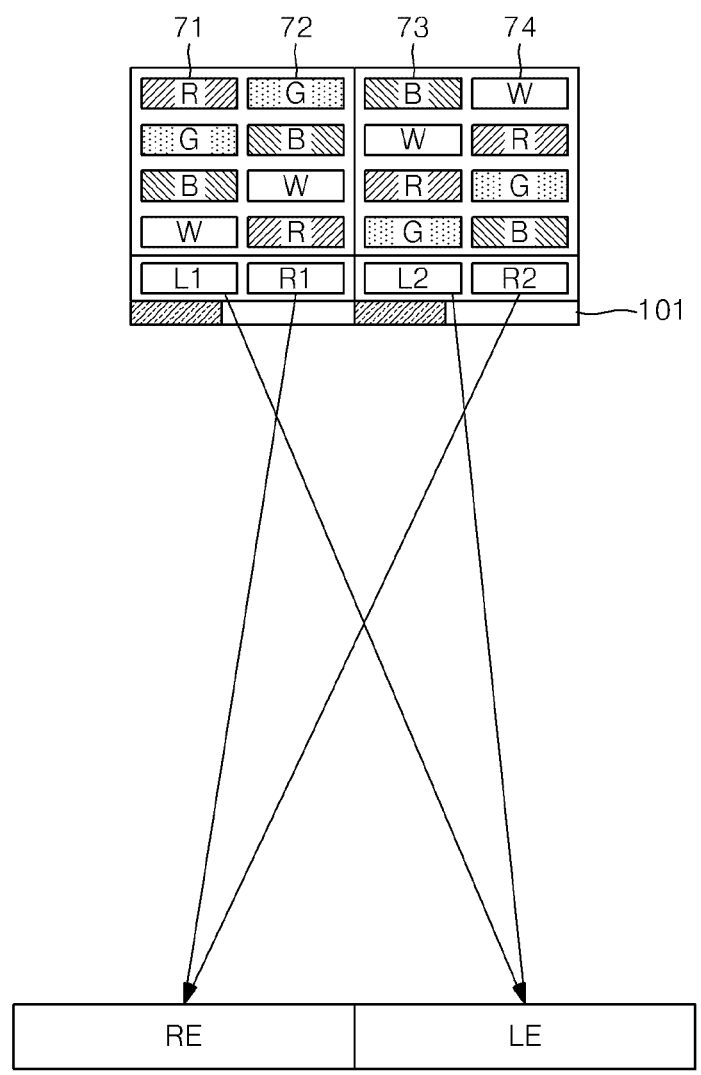
FIG. 5B illustrates an operation of realizing two-view stereoscopic image through parallax barriers in an auto stereoscopic display according to an exemplary embodiment of the present invention.

FIG. 5A illustrates an operation of forming an image in an auto stereoscopic display including first, second, third, and fourth pixels 71, 72, 73, and 74. The first and third pixels 71 and 73 are used to form images L1 and L2 for a left eye and the second and fourth pixels 72 and 74 are used to form right images R1 and R2 for a right eye. A lenticular lens 100 corresponds to the first and second pixels 71 and 72, and a lenticular lens 100 corresponds to the third and fourth pixels 73 and 74. In other words, a lenticular corresponds to a pair of left eye pixels and a pair of right eye images. The lenticular lenses 100 are used to separate left and right images. Here, lenticular lenses separate left and right images to advance the left and right images into left and right viewing fields LE and RE, respectively, so as to realize a 3-D image. Besides the lenticular lenses 100, parallax barriers 101 may be used as viewing field separating units as shown in FIG. 5B. The parallax barriers 101 show left and right images to be seen through left and right eyes using lengthwise lattice rows, i.e., barriers. Thus, a vertical image to come into a left eye and a vertical image to come into a right eye are distributed to the left and right eyes, respectively, by the barriers. As a result, the left and right eyes are shown as images having different view points so as to realize a stereoscopic image.

Here, images photographed in different view points may be constituted as left and right images to realize a 3-D image. Alternatively, images photographed in the same view point may be constituted as left and right images to realize a two-dimensional (2-D) image.

FIG. 6 illustrates an operation of realizing a multi-view stereoscopic image in an auto stereoscopic display including first, second, third, and fourth pixels 81, 82, 83, and 84, according to an exemplary embodiment of the present invention. Here, a lenticular lens 110 correspond to the first, second, third, and fourth pixels 81, 82, 83, and 84.

The first, second, third, and fourth lenses 81, 82, 83, and 84 are respectively used to form first, second, third, and fourth images 1, 2, 3, and 4 in first, second, third, and fourth view points. The first, second, third, and fourth images 1, 2, 3, and 4 are divided and focused into and four viewing points through the lenticular lens 110 so as to realize a multi-view 3-D image. As described above, a lenticular lens can be disposed to correspond to a plurality of pairs of left eye pixels and a plurality of pairs of right eye pixels so as to realize an image having a plurality of view points. Here, the same image can be input into each pixel to realize a 2-D image.

As described above, an auto stereoscopic display according to the present invention can include left and right eye pixels respectively having white sub pixels so as to improve brightness. Also, the auto stereoscopic display can realize a 3-D image without lowering resolution using a space division method.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An auto stereoscopic display having sub pixels which comprise color sub pixel and white sub pixel comprising:
    a left eye pixel comprising a plurality of first color sub pixels and a first white sub pixel;
    a right eye pixel comprising a plurality of second color sub pixels and a second white sub pixel; and
    a viewing field separating unit which separates a viewing field of a left image formed by the left eye pixel and a viewing field of a right image formed by the right eye pixel,
    wherein the first color sub pixels and the first white sub pixel are arranged in one column and the second color sub pixels and the second white sub pixel are arranged in the other another column, and
    wherein the left eye pixel and the right eye pixel are arranged in a matrix format in which sub pixels having the same colors are diagonally aligned in one of diagonal directions, and orders of sub pixels in a widthwise direction are the same as orders of sub pixels in a lengthwise direction.

2. The auto stereoscopic display of claim 1, wherein the first and second white sub pixels are arranged in different lines.

3. The auto stereoscopic display of claim 1, wherein the first color sub pixels comprises a red sub pixel, a green sub pixel, and a blue sub pixel, and the second color sub pixels comprises a red sub pixel, a green sub pixel, and a blue sub pixel, wherein each of the red and blue sub pixels of the left eye pixel is arranged by sides of the red and blue sub pixels of the right eye pixel, and each of the green and white sub pixels of the left eye pixel is arranged by sides of the green and white sub pixels of the right eye pixel.

4. The auto stereoscopic display of claim 1, wherein the viewing field separating unit comprises a lenticular lens which is disposed to correspond to a pair of left eye pixels and a pair of right eye pixels.

5. The auto stereoscopic display of claim 1, wherein the viewing field separating unit comprises a lenticular lens which is disposed to correspond to a plurality of pairs of left eye pixels and a plurality of pairs of right eye pixels.

6. The auto stereoscopic display of claim 1, wherein the viewing field separating unit comprises a parallax barrier.

7. The auto stereoscopic display of claim 1, wherein the first white sub pixel is arranged in a lowest sub pixel line of the left eye pixel in the matrix, and the second white sub pixel is arranged in a highest sub pixel line of the right eye pixel in the matrix.

8. The auto stereoscopic display of claim 1, wherein the first color sub pixels of the left eye pixel comprise a first color sub pixel, a second color sub pixel, and a third color sub pixel, and the second color sub pixels of the right eye pixel comprise a fourth color sub pixel, a fifth color sub pixel, and a sixth color sub pixel, and the first and second color sub pixels are arranged in a vertical line, the fourth and fifth color sub pixels are arranged in a vertical line by the first and second color sub pixels, the third color sub pixel and the first white sub pixel are arranged in a vertical line by the fourth and fifth color sub pixels, and the sixth color sub pixel and the second white sub pixel are arranged in a vertical line by the third color sub pixel and the first white sub pixel.

9. The auto stereoscopic display of claim 1, wherein the plurality of first color sub pixels, the first white sub pixel, the plurality of second color sub pixels, and the second white sub pixel are a same size.

* * * * *